United States Patent
Oguma et al.

(10) Patent No.: US 9,026,588 B2
(45) Date of Patent: May 5, 2015

(54) STORAGE DEVICE INCLUDING SOFTWARE DEVELOPMENT KIT THAT INCLUDES WEB SERVICE INTERFACE AND TERMINAL APPARATUS INCLUDING THE SOFTWARE DEVELOPMENT KIT

(71) Applicants: Takashi Oguma, Osaka (JP); Shingo Ueno, Osaka (JP); Rie Kasai, Osaka (JP); Toshihide Higashimori, Osaka (JP)

(72) Inventors: Takashi Oguma, Osaka (JP); Shingo Ueno, Osaka (JP); Rie Kasai, Osaka (JP); Toshihide Higashimori, Osaka (JP)

(73) Assignee: KYOCERA Document Solutions Inc. (JP)

( * ) Notice: Subject to any disclaimer, the term of this patent is extended or adjusted under 35 U.S.C. 154(b) by 346 days.

(21) Appl. No.: 13/669,125

(22) Filed: Nov. 5, 2012

(65) Prior Publication Data

US 2013/0117356 A1    May 9, 2013

(30) Foreign Application Priority Data

Nov. 5, 2011   (JP) .................................. 2011-242938
Nov. 5, 2012   (EP) .................................... 12191292

(51) Int. Cl.
| | |
|---|---|
| *G06F 15/16* | (2006.01) |
| *G06Q 10/06* | (2012.01) |
| *G06F 9/44* | (2006.01) |
| *H04L 29/08* | (2006.01) |
| *G06F 9/54* | (2006.01) |

(52) U.S. Cl.
CPC ........ *G06Q 10/06* (2013.01); *G06F 8/30* (2013.01); *H04L 67/2823* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 2003/0070006 A1* | 4/2003 | Nadler et al. .................. | 709/330 |
| 2005/0091374 A1* | 4/2005 | Ganesan et al. ............... | 709/225 |
| 2005/0149543 A1* | 7/2005 | Cohen et al. .................. | 707/100 |
| 2010/0049628 A1 | 2/2010 | Mannava et al. | |

* cited by examiner

*Primary Examiner* — Don Wong
*Assistant Examiner* — Reshaun M Finkley
(74) *Attorney, Agent, or Firm* — McDonnell Boehnen Hulbert & Berghoff LLP

(57) ABSTRACT

A storage device including a software development kit that includes a Web service interface includes a communication unit, a conversion table, a reverse conversion unit, and a conversion unit. The communication unit transmits a request message to a Web service and receives a response message from the Web service. The conversion table stores a pre-conversion side service method name of the Web service that is corresponded with a post-conversion side service method name. The reverse conversion unit, when data regarding the request message includes the post-conversion side service method name stored in the conversion table, converts the post-conversion side service method name into the corresponding pre-conversion side service method name. The conversion unit, when data regarding the response message includes the pre-conversion side service method name stored in the conversion table, converts the pre-conversion side service method name into the corresponding post-conversion side service method name.

14 Claims, 12 Drawing Sheets

| No | PRE-CONVERSION SIDE SERVICE METHOD NAME | POST-CONVERSION SIDE SERVICE METHOD NAME |
|---|---|---|
| 0 | wordCount | countWord |
| 1 | getInfo | getInformation |
| ⋮ | ⋮ | ⋮ |

FIG. 5

```
<?xml version='1.0' encoding='UTF-8'?>
<env:Envelope ......... >
  <env:Header>
    ..........................................
  <env:/Header>
  <env:Body>
    <m:countWord
        xmlns:m="http://api.abc.com/"
        env:encodingStyle="http://schemas.xmlsoap.org/soap/encoding/">
      <html xsi:type="xsd:string">http://abx.com/copy.html</word>
                    <word xsi:type="xsd:string">copy</word>
    </m:countWord>
  </env:Body>
</env:Envelope>
```

FIG. 6A

```
<?xml version='1.0' encoding='UTF-8'?>
<env:Envelope ......... >
  <env:Header>
    ..........................................
  <env:/Header>
  <env:Body>
    <m:wordCount
        xmlns:m="http://api.abc.com/"
        env:encodingStyle="http://schemas.xmlsoap.org/soap/encoding/">
      <html xsi:type="xsd:string">http://abx.com/copy.html</word>
                    <word xsi:type="xsd:string">copy</word>
    </m:wordCount>
  </env:Body>
</env:Envelope>
```

FIG. 6B

```
<?xml version='1.0' encoding='UTF-8'?>
<env:Envelope ........ >
  <env:Header>
    ..................................
  <env:/Header>
  <env:Body>
    <m:wordCountResponse
        xmlns:m="http://api.abc.com/"
        env:encodingStyle="http://schemas.xmlsoap.org/soap/encoding/">
      <count xsi:type="xsd:int">12</count>
    </m:wordCountResponse>
  </env:Body>
</env:Envelope>
```

FIG. 7A

```
<?xml version='1.0' encoding='UTF-8'?>
<env:Envelope ........ >
  <env:Header>
    ..................................
  <env:/Header>
  <env:Body>
    <m:countWordResponse
        xmlns:m="http://api.abc.com/"
        env:encodingStyle="http://schemas.xmlsoap.org/soap/encoding/">
      <count xsi:type="xsd:int">12</count>
    </m:countWordResponse>
  </env:Body>
</env:Envelope>
```

FIG. 7B

STORAGE DEVICE INCLUDING SOFTWARE DEVELOPMENT KIT THAT INCLUDES WEB SERVICE INTERFACE AND TERMINAL APPARATUS INCLUDING THE SOFTWARE DEVELOPMENT KIT

REFERENCE TO RELATED APPLICATIONS

This application is based upon, and claims the benefit of priority from, corresponding Japanese Patent Application No. 2011-242938, filed in the Japan Patent Office on Nov. 5, 2011, and European Patent Application No. EP12191292.9, filed on Nov. 5, 2012, the entire contents of both of which are incorporated herein by reference.

BACKGROUND

1. Field

The present disclosure relates to a storage device including a software development kit ("SDK") that includes a client side Web service interface coupled between a communication unit for transmitting a request message to a Web service and receiving a response message from the Web service, and an extended application. The present disclosure also relates to a terminal apparatus that includes the SDK.

2. Description of the Related Art

To ensure security, it is generally prohibited to bring a computer for private use into an office.

However, in view of the widespread use of mobile terminal apparatuses such as smart phones, attempts are being made to increase the efficiency with which business is carried out by removing this prohibition under specified conditions.

On the other hand, there is a case in which a user utilizes a plurality of cloud services since the types and fees of services of cloud servers are different from one another.

When a user or a third party develops an extended application for remotely controlling an image forming apparatus in the office and for reading and changing the setting information thereof through a Web service for the apparatus using a smart phone, or develops an extended application for utilizing a cloud service using a smart phone, smooth development of extended applications is difficult, since the rules of naming service methods of Web service providers are generally different from one another. This leads to increased programming errors and longer development periods of the extended applications.

Such a phenomenon is seen also in the development of extended applications which are installed in terminal apparatuses, such as desktop computers, other than smart phones.

SUMMARY

The present disclosure relates to a storage device including an SDK that includes a client side Web service interface, that may allow smoother development of an extended application that utilizes Web services provided by a plurality of Web service providers. The present disclosure also relates to a terminal apparatus including the SDK.

A storage device including an SDK that includes a Web service interface according to an embodiment of the present disclosure includes a communication unit, a conversion table, a reverse conversion unit, and a conversion unit. The communication unit transmits a request message to a Web service and receives a response message from the Web service. The conversion table stores a pre-conversion side service method name of the Web service that is corresponded with a post-conversion side service method name. The reverse conversion unit, when data regarding the request message includes the post-conversion side service method name stored in the conversion table, converts the post-conversion side service method name into the corresponding pre-conversion side service method name. The conversion unit, when data regarding the response message includes the pre-conversion side service method name stored in the conversion table, converts the pre-conversion side service method name into the corresponding post-conversion side service method name.

A terminal apparatus that includes a Web service interface according to an embodiment of the present disclosure includes a communication unit, a conversion table, a reverse conversion unit, and a conversion unit. The communication unit transmits a request message to a Web service and receives a response message from the Web service. The conversion table stores a pre-conversion side service method name of the Web service that is corresponded with a post-conversion side service method name. The reverse conversion unit, when data regarding the request message includes the post-conversion side service method name stored in the conversion table, converts the post-conversion side service method name into the corresponding pre-conversion side service method name. The conversion unit, when data regarding the response message includes the pre-conversion side service method name stored in the conversion table, converts the pre-conversion side service method name into the corresponding post-conversion side service method name.

Additional features and advantages are described herein, and will be apparent from the following Detailed Description and the figures.

BRIEF DESCRIPTION OF FIGURES

In the accompany drawings:

FIG. 5 shows a schematic diagram illustrating an example of a conversion table within the Web service interface;

FIG. 6A shows an XML example of a service method call before conversion.

FIG. 6B shows an XML example of a service method call after conversion.

FIG. 7A shows an XML example of a return value of a service method call before conversion.

FIG. 7B shows an XML example of a return value of the service method call after conversion.

DETAILED DESCRIPTION

First Embodiment

Figure 1:
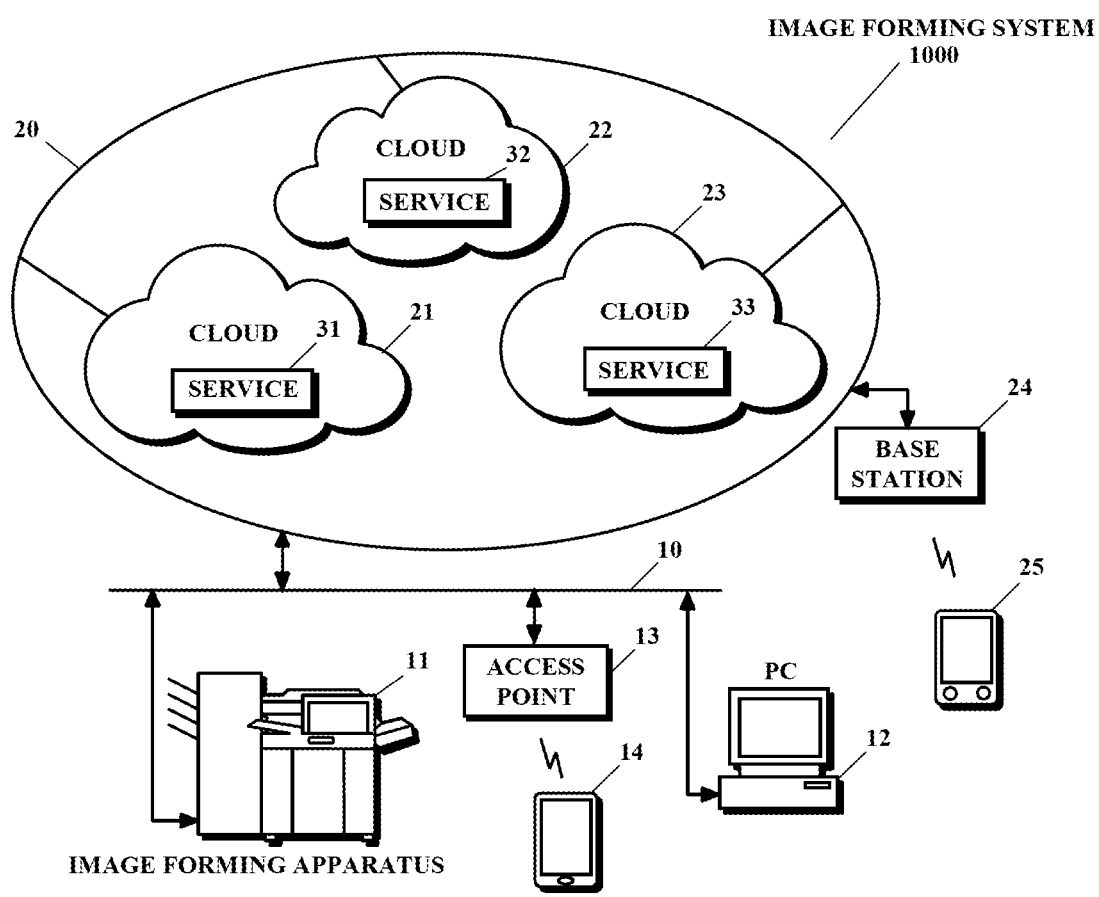
FIG. 1 shows a schematic diagram illustrating a configuration of an image forming system that utilizes a plurality of cloud services, according to a first embodiment of the present disclosure.

FIG. 1 shows a diagram illustrating a configuration of an image forming system 1000 that utilizes a plurality of cloud services (31-33), according to an embodiment of the present disclosure.

In the image forming system 1000, an image forming apparatus 11, a personal computer ("PC") 12 as a terminal apparatus, and an access point 13 of a wireless local area network ("LAN") are coupled to an intranet 10. A smart phone 14 as a mobile terminal apparatus is coupled to the intranet 10 via the access point 13. The intranet 10 is coupled to the Internet 20 via a router (not illustrated). A plurality of cloud servers 21-23 are coupled to the Internet 20. A base station 24 is coupled to the Internet 20, and smart phone 25 is coupled to the Internet 20 via the base station 24.

The plurality of cloud servers 21-23 may respectively provide the cloud services 31-33 to the PC 12 and the smart phones 14 and 25.

By installing an extended application on the PC 12 and the smart phones 14 and 25, a user may perform from these apparatuses at least one of the services of the image forming apparatus 11 such as copying, printing, and faxing, the cloud services 31-33, and any combination of these services, as a Web service. Similarly, a user may obtain setting information of the image forming apparatus 11 and modify the setting information.

Referring to FIG. 1, a plurality of terminal apparatuses are represented by the PC 12, a plurality of mobile terminal apparatuses for the access point 13 are represented by the smart phone 14, and a plurality of mobile terminal apparatuses for the base station 24 are represented by the smart phone 25.

Figure 2:
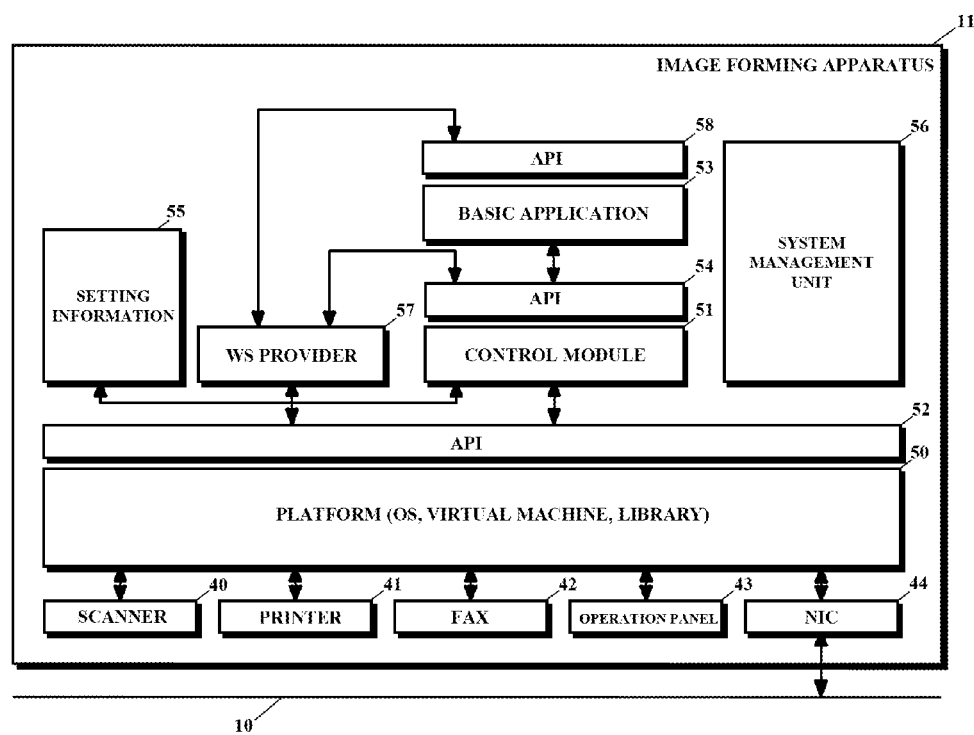
FIG. 2 shows a block diagram illustrating the configuration of an image forming apparatus in the image forming system.

FIG. 2 shows a block diagram illustrating the configuration of the image forming apparatus 11 in the image forming system 1000.

The image forming apparatus 11 includes a scanner 40, a printer 41, a FAX 42, an operation panel 43, and a network interface card ("NIC") 44, as hardware components. The input/output control of the hardware components (40-44) is performed via a platform 50.

The platform 50 includes an operating system ("OS") that performs the input/output control, power supply management, communication using, for example, the Transmission Control Protocol/Internet Protocol ("TCP/IP"), various device drivers in a layer below the OS, virtual machines as class libraries on the OS, such as a Java (registered trademark) virtual machine and the Common Language Runtime ("CLR"), and a development environment, such as one consisting of standard libraries and compilers.

A control module 51 as a class library controls the hardware components (40-44) via an application interface ("API") 52 of the platform 50. A basic application 53 controls the hardware components (40-44) via an API 54 of the control module 51 on the basis of functions, such as copying, printing, and faxing.

The setting information for the hardware components (40-44) is stored in a setting information database 55 by the control module 51 in response to operation of the operation panel 43. The stored setting information is displayed on the operation panel 43 by the control module 51 in response to operation of the operation panel 43.

A system management unit 56 performs process for, for example, authentication and/or authorization for a user, error management, and power saving management, via the API 52 or the API 54.

A request for service from at least one of the PC 12 and the smart phones 14 and 25 to the image forming apparatus 11 is transmitted to a Web service provider 57 via the NIC 44 and the platform 50. In response to the request, the Web service provider 57, by making the basic application 53 operate via an API 58, reads setting information from the setting information database 55 via the API 54 and/or changes the settings in the setting information database 55. Then, the Web service provider 57 replies with the results.

Figure 3:
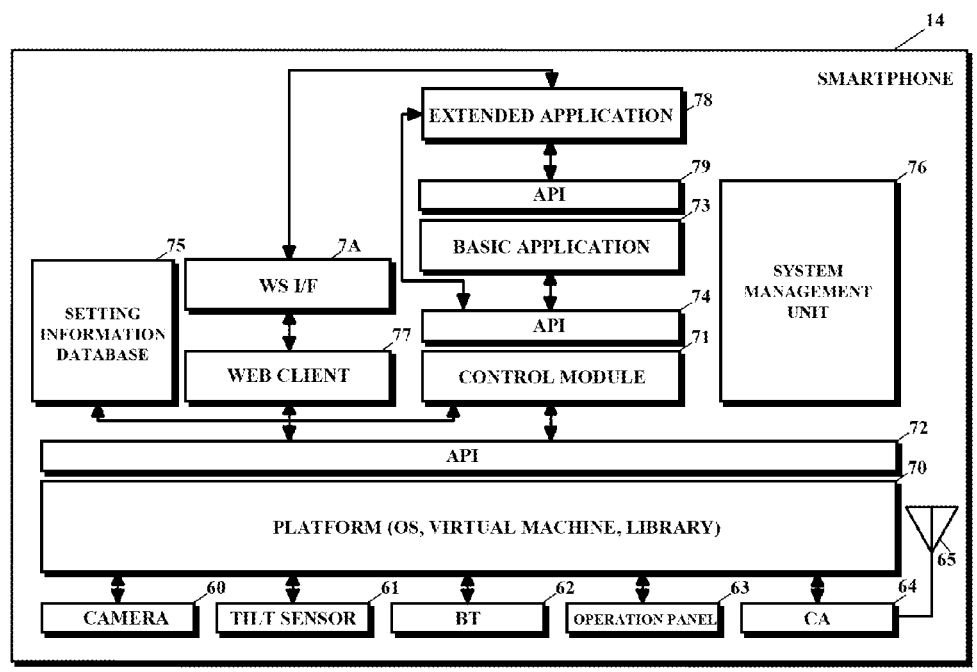
FIG. 3 shows a block diagram of the configuration of a mobile terminal apparatus in the image forming system.

FIG. 3 shows a block diagram of the configuration of the smart phone 14, which is a mobile terminal apparatus in the image forming system 1000. The configuration of the smart phone 25 is the same as that of the smart phone 14.

The smart phone 14 includes a camera 60, an inclination sensor 61, a Bluetooth communication unit ("BT") 62, an operation panel 63, a communication adapter ("CA") 64, and the like, as hardware components. An antenna 65 is coupled to the communication adapter 64. The input/output control of the hardware components (61-64) is performed via a platform 70.

The platform 70 includes an OS that performs the input/output control, power supply management, communication using the TCP/IP, and the like, various device drivers in a layer below the OS, a virtual machine as a class library on the OS, and standard libraries.

A control module 71 controls the hardware components (61-64) via an API 72 of the platform 70. A basic application 73 controls the hardware components (60-64) via an API 74 of the control module 71 on the basis of functions.

The setting information for the hardware components (60-64) is stored in a setting information database 75 by the control module 71 in response to operation of the operation panel 63. The stored setting information is displayed on the operation panel 63 by the control module 71 in response to operation of the operation panel 63.

A system management unit 76 performs process for, for example, authentication and/or authorization for a user, error management, and power saving management, via the API 72 or the API 74.

In response to operation of the operation panel 63, a Web client 77 transmits a request to a specified URL via the API 72, and makes the operation panel 63 display the content received in the response.

An extended application 78, via an API 79 of the basic application 73, makes a single function or a combination of a plurality of functions be performed, reads the setting information in the setting information database 75 via the API 74 and makes the information be displayed on the operation panel 63, or makes the setting information in the setting information database 75 be changed.

The extended application 78 sends a request to the Web service provider 57 of the image forming apparatus 11 or the cloud services 31-33 of the cloud servers 21-23 via a Web service interface 7A and the Web client 77. The extended application 78 receives the results via the Web client 77 and the Web service interface 7A and makes the content of the results be displayed on the operation panel 63.

Figure 4:
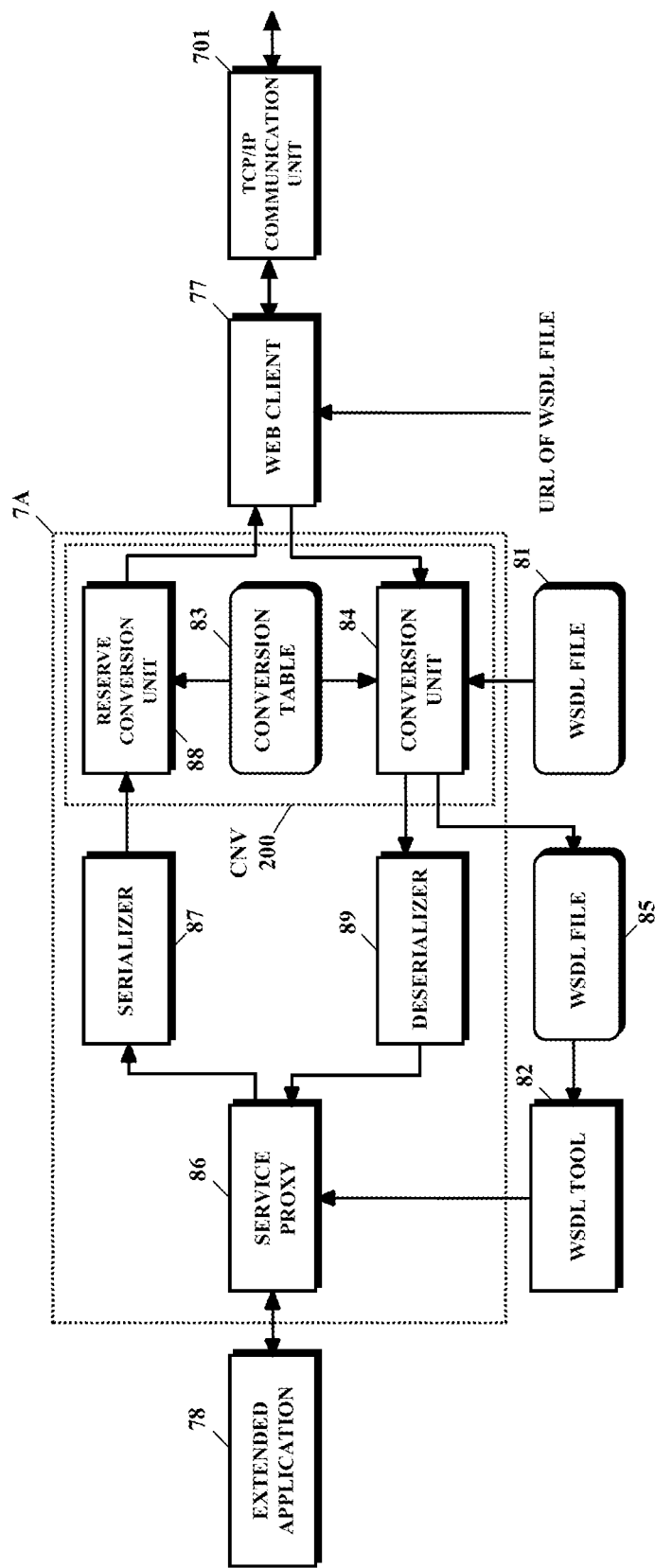
FIG. 4 shows a block diagram of the configuration of a Web service interface and the portions related thereto at the time of developing an extended application.

FIG. 4 shows a block diagram of the configuration of the Web service interface 7A and the portions related thereto at the time of developing the extended application 78.

The Web client 77, in response to input of the URL of a Web Service Description Language ("WSDL") file by a developer, transmits a request to this URL via a TCP/IP communication unit 701 of the platform 70. A response to the request is received via the TCP/IP communication unit 701 and the Web client 77 and stored as a WSDL file 81.

In the related art, a service proxy 86 is generated by a WSDL tool 82 on the basis of the WSDL file 81. In the present embodiment, the Web service interface 7A includes a converter ("CNV") 200. The WSDL file 81 is copied, and a WSDL file 85 is created from this copy such that specific service method names among the service method names included in the copied WSDL file 81 have been converted into other service method names while the rest of the service method names are left as they are. The service proxy 86 is generated by the WSDL tool 82 on the basis of the content of the WSDL file 85.

FIG. 5 shows a diagram illustrating an example of a conversion table 83 within the Web service interface 7A. In the line in which No=0 of the conversion table 83, a service method name in the form of "noun+verb" is converted into a service method name in the form of "verb+noun", whereby the forms of service method names are made the same. In the line in which No=1 of the conversion table 83, a service method name including an abbreviation form is converted into a service method name without an abbreviation, whereby the forms of service method names are made the same.

Referring back to FIG. 4, the service proxy 86 makes a request to an external Web service and a response thereto is seen as a call of an internal method and a return of a return value thereto, from the viewpoint of the extended application 78.

A call of a service method from the extended application 78 to the service proxy 86 is converted by a serializer 87 into Extensible Markup Language ("XML") code which conforms to the Simple Object Access Protocol ("SOAP"). The CNV 200 further includes a reverse conversion unit 88. When a service method name included in the XML code includes a service method name on the extended application 78 side (post-conversion side service method name), the service method name is converted (reverse conversion) into a service method name defined on the service provider side (pre-conversion side service method name).

FIG. 6A shows an XML example of a service method call before conversion. FIG. 6B illustrates an XML example of the service method call after conversion. In the figures, dotted lines denote omitted portions.

Referring to FIG. 6A, the element name of the first child element of the BODY element represents a service method name and, hence, "countWord" is the service method name. The child element of the element with the service method name "countWord" is an argument of this method. The element names "html" and "word" are the argument names, where the argument values are respectively "http://abx.com/copy.html" and "copy". The service method name "countWord" refers to a service method that counts the number of times the word "copy" appears in a page "http://abx.com/copy.html".

Referring back to FIG. 4, the Web client 77, by making the XML code after conversion be the body of a Hyper Text Transfer Protocol ("HTTP") message, performs communication based on the HTTP with a Web server that is included in a Web service provider on the Web service side.

As a processing result on the Web service side, the processing result in XML is provided to a conversion unit 84 of the CNV 200 via the TCP/IP communication unit 701 and the Web client 77. When a Web service response name included in the XML code includes a pre-conversion side service method name stored in the conversion table 83, the conversion unit 84 converts the Web service response name into a method name on the extended application 78 side (post-conversion side service method name).

FIG. 7A illustrates an XML example of a return value of a service method call before conversion. FIG. 7B illustrates an XML example of a return value of the service method call after conversion. In the figures, dotted lines denote omitted portions.

Referring to FIG. 7A, the element name of the first child element of the BODY element represents a service method name+"Response" and, hence, the element name is "wordCountResponse". The child element of the element with this element name is a return value of this method, the element name "count" is the name of the return value and the value is "12". Since "wordCountResponse" includes the pre-conversion side service method name "wordCount" stored in the conversion table 83, "wordCountResponse" is converted into "countWordResponse" by the conversion unit 84.

Referring back to FIG. 4, the XML code after the conversion is converted into a return value for the service method call by a deserializer 89. The service proxy 86 returns the return value to the extended application 78.

Figure 8:
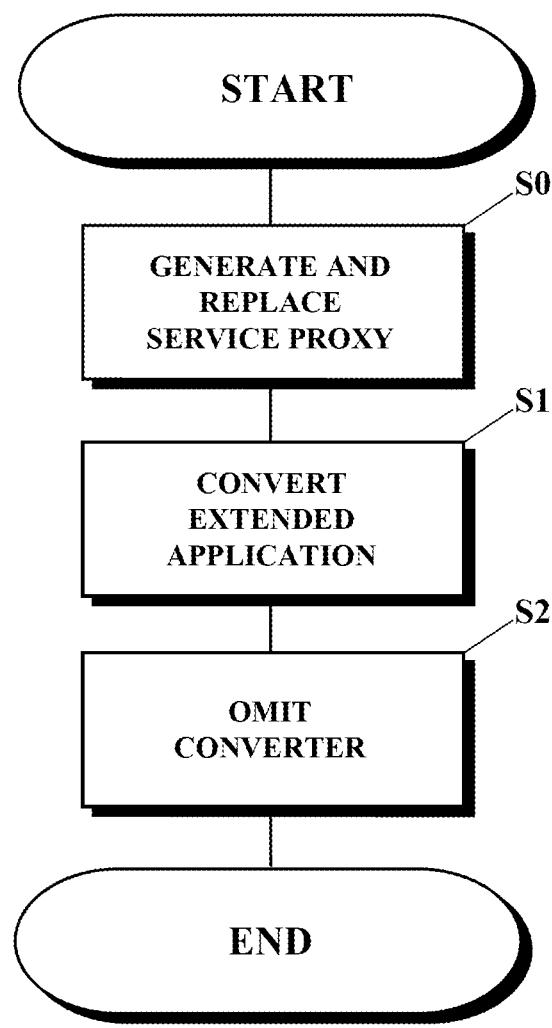
FIG. 8 shows a flowchart illustrating post process after the development of an extended application has been completed.
Figure 9:
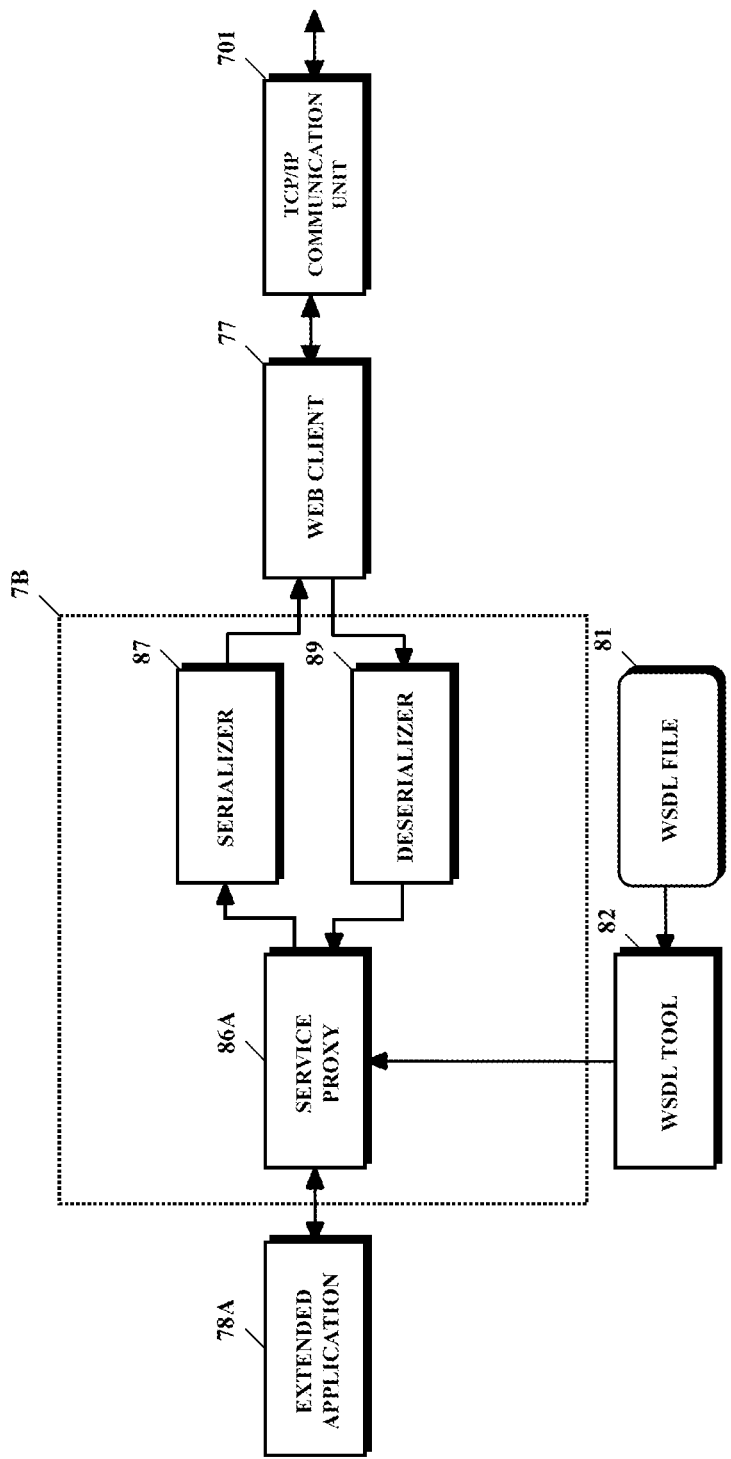
FIG. 9 shows a block diagram of a Web service interface and the related portions after the post process.

FIG. 8 shows a flowchart illustrating post process after the development of the extended application 78 has been completed. FIG. 9 shows a block diagram of a Web service interface 7B and the portions related thereto after the post process.

Step S0

A service proxy 86A is generated by the WSDL tool 82 on the basis of the content of the WSDL file 81, and replaces the service proxy 86.

Step S1

The extended application 78, after a piece of the source code thereof including a post conversion service method stored in the conversion table 83 has been replaced by a corresponding pre-conversion side service method name, is converted to an extended application 78A.

Step S2

The CNV 200 in FIG. 4 is omitted, and the serializer 87 and the deserializer 89 are directly logically combined with the Web client 77, whereby the Web service interface 7A is made to be the Web service interface 7B.

Figure 10:
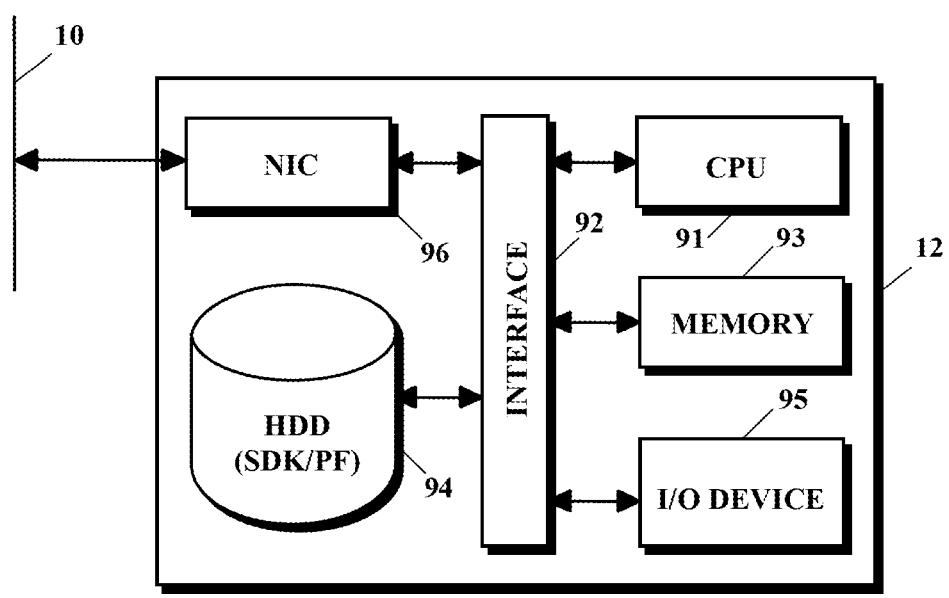
FIG. 10 shows a block diagram of the hardware configuration of a terminal apparatus in the image forming system.
Figure 11:
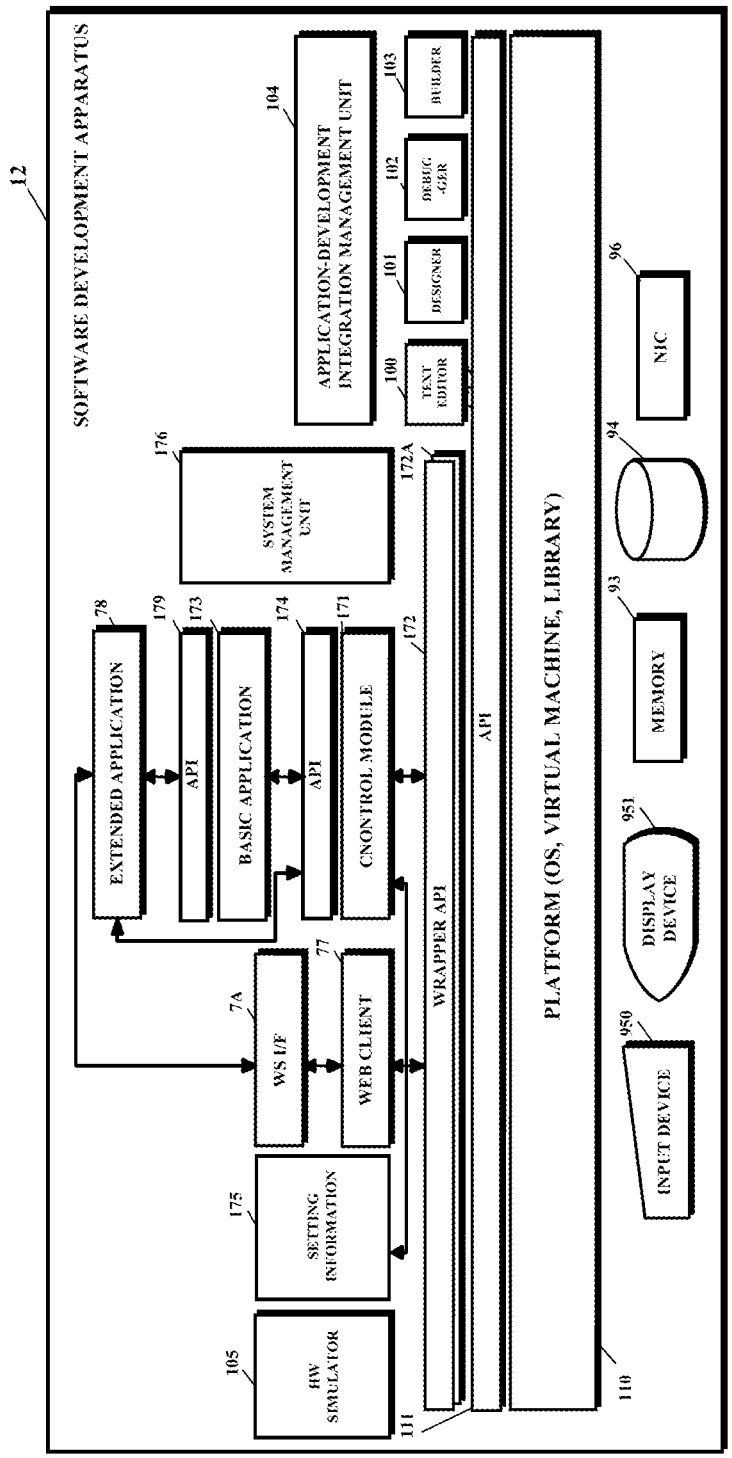
FIG. 11 shows a block diagram of the configuration of the terminal apparatus when used as a software development apparatus.

FIG. 10 shows a block diagram of the hardware configuration of the terminal apparatus PC 12 in the image forming system 1000. FIG. 11 shows a block diagram of the configuration of the terminal apparatus PC 12 when used as a software development apparatus.

In the terminal apparatus PC 12, a CPU 91 is coupled to a memory 93, a hard disk drive ("HDD") 94, an input/output apparatus 95, and a network interface card ("NIC") 96 via an interface 92. In FIG. 10, a plurality of interfaces is represented by a single block 92 for simplicity.

The memory 93 includes, for example, a flash memory storing a BIOS and a DRAM used as a main memory. The HDD 94, which is example of a storage device, stores an OS, various device drivers, libraries, and virtual machines, as a platform ("PF"), and further an SDK. The NIC 96 is coupled to the intranet 10.

The software development apparatus 12 illustrated in FIG. 11 supports the development of the extended application 78 illustrated in FIG. 3. Components 172A, 171, 173 to 176, and 179 illustrated in FIG. 11 respectively correspond to the components 72, 71, 73 to 76, and 79 illustrated in FIG. 3. Regarding the components 172A, 171, 173 to 176, and 179, only components among the corresponding components 72, 71, 73 to 76, and 79 necessary for developing the extended application 78 need to be provided. Wrapper APIs 172 and 172A are used to disguise an API 111 respectively as the API 52 (FIG.

2) and the API 72 (FIG. 3) through wrapping. The WSDL tool 82 is included in a standard library within a platform 110.

The software development apparatus 12, similarly to a representative SDK development apparatus, includes a text editor 100, a designer 101, a debugger 102, a builder 103, and an application development integrated management unit 104 which performs process for calling one of these components in response to an operation performed by a user, process for generating a project, and the like. The designer 101 supports the development of an application for designing the screen of the operation panel 63 and automatically generates a program on the basis of a visual design.

The software development apparatus 12 further includes a simulator 105 simulating the hardware ("HW") of the smart phone 14. An input apparatus 950 and a display apparatus 951 form the input/output apparatus 95 illustrated in FIG. 10. The components other than the extended application 78 and the service proxy 86 in the Web service interface 7A (FIG. 4) illustrated in FIG. 11 are provided in advance as the components of a development environment.

According to the first embodiment, the conversion table 83 is provided which stores pre-conversion side service method names of a Web service and corresponding post-conversion side service method names. When a request message for the Web service includes a post-conversion side service method name stored in the conversion table 83, the reverse conversion unit 88 converts the post-conversion side service method name into a corresponding pre-conversion side service method name. When a response message includes a pre-conversion side service method name stored in the conversion table 83, the conversion unit 84 converts the pre-conversion side service method name into a corresponding post-conversion side service method name. Hence, in the case of developing an application that uses the Web services of a plurality of Web service providers, even when naming rules are different among the providers, the naming rules are made the same, whereby the application may be more smoothly developed without causing confusion.

Further, since only conversion process on serialized text data is required, the general purpose CNV 200 may be used independent of the types of Web service or platform.

The service proxy 86 in the case of using the CNV 200 is easily generated using the general purpose CNV 200 and the WSDL tool 82.

In addition, after an extended application has been developed using the CNV 200, the CNV 200 may be omitted, leading to an increase in processing speed.

Second Embodiment

Figure 12:
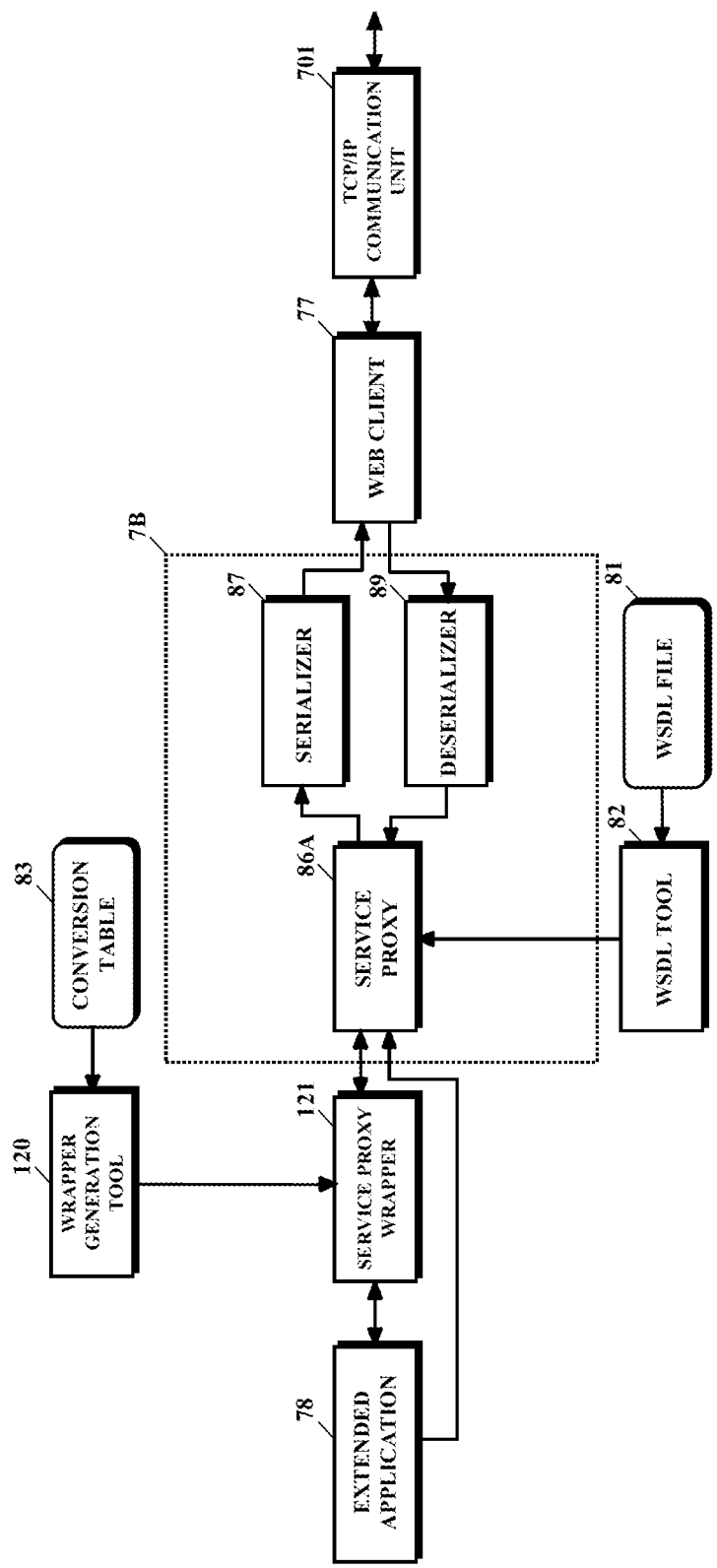
FIG. 12 shows a block diagram of the configuration of a Web service interface and the portions related thereto at the time of developing an extended application, according to a second embodiment of the present disclosure.

FIG. 12 shows a block diagram of the configuration of a Web service interface and the portions related thereto at the time of developing an extended application, according to a second embodiment of the present disclosure.

The second embodiment has a configuration in which a wrapper generation tool 120 and a conversion table 83 have been added to the block configuration illustrated in FIG. 9. The wrapper generation tool 120 generates a service proxy wrapper 121. Further, the extended application 78 illustrated in FIG. 4 is used instead of the extended application 78A illustrated in FIG. 9.

Among the service methods called by the extended application 78, a service method whose service method name is not the same as any of the pre-conversion side service method names in the conversion table 83 exists in the service proxy 86A and, hence, a service method within the service proxy 86A is directly called. In the case of a service method whose service method name is the same as a service method name in the conversion table 83 among the service methods called by the extended application 78, a corresponding service method in the service proxy wrapper 121 is called and this service method calls a corresponding service method in the service proxy 86A.

The service proxy wrapper 121 is generated by the wrapper generation tool 120 with reference to the conversion table 83, and is provided in advance in the PC 12 illustrated in FIG. 11.

The post process illustrated in FIG. 8 may be also performed in the second embodiment. In other words, after the development of the extended application 78 has been completed, among the pieces of the source code of the extended application 78, a piece of the source code that is the same as a post-conversion side service method name included in the conversion table 83 is replaced by a corresponding pre-conversion side service method name. Thus, the extended application 78A is created, and by omitting the service proxy wrapper 121, the block configuration illustrated in FIG. 9 may be obtained. This produces a result which is the same as that obtained when the extended application 78A is created without using the wrapper generation tool 120 and the service proxy wrapper 121.

The present disclosure of the embodiment includes various other embodiments. For example, other designs may be used in which the above-described components are each present.

In the first and second embodiments, for example, SOAP over HTTP is used. However, a protocol for transmitting a SOAP message other than HTTP may be used, and the Representational State Transfer ("REST") protocol or the XML Remote Procedure Call ("XML-RPC") protocol may be used instead of SOAP.

For example, although a processing speed is increased by the post process described above, the post process may not be performed in the first and second embodiments.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A storage device comprising a software development kit developing a first extended application that sends a request to a Web service provider of each of a plurality of cloud services or image forming apparatuses via a Web service interface, receives results, and displays a content of the results on a terminal apparatus, the software development kit that includes the Web service interface, comprising:

a communication unit configured to transmit a request message to the Web service provider and receive a response message from the Web service provider;

a conversion table configured to store a pre-conversion side service method name of the Web service that corresponds with a post-conversion side service method name;

a reverse conversion unit configured to, when data regarding the request message includes the post-conversion side service method name stored in the conversion table, convert the post-conversion side service method name into the corresponding pre-conversion side service method name;

a conversion unit configured to, when data regarding the response message includes the pre-conversion side service method name stored in the conversion table, convert the pre-conversion side service method name into the corresponding post-conversion side service method name, wherein forms of both the pre-conversion side service method name and the post-conversion side service method name are made the same, by converting a service method name in the form of "noun+verb" into a service method name in the form of "verb+noun", or by converting a service method name including an abbreviation form into a service method name without an abbreviation;

a first service proxy configured to receive a service method call from the first extended application and transmit the response message to the first extended application;

a serializer configured to serialize the service method call and transmit the serialized service method call to the communication unit; and a deserializer configured to receive the serialized service method call from the communication unit, deserialize the serialized service method call, and transmit the deserialized service method call to the first service proxy, wherein a post process is performed after development of the first extended application has been completed, and the post process includes i) generating a second service proxy based on a Web Service Description Language (WSDL) file using a WSDL tool; ii) replacing the first service proxy with the second service proxy; iii) converting the first extended application to a second extended application after a piece of source code of the first extended application including a post-conversion service method stored in the conversion table has been replaced by a corresponding pre-conversion side service method name; iv) omitting the conversion table, the reverse conversion unit, and the conversion unit; and v) combining the serializer and the deserializer to a Web client of the terminal apparatus.

2. The storage device according to claim 1, wherein both the conversion unit and the reverse conversion unit are coupled between the first service proxy and the communication unit.

3. The storage device according to claim 1, wherein both the conversion unit and the reverse conversion unit are coupled between the first service proxy and the first extended application.

4. The storage device according to claim 1,
wherein the data regarding the request message includes the serialized request message, and
wherein the data regarding the response message includes the serialized response message.

5. The storage device according to claim 4,
wherein the reverse conversion unit is coupled between the serializer and the communication unit, and
wherein the conversion unit is coupled between the deserializer and the communication unit.

6. The storage device according to claim 1,
wherein the data regarding the request message includes code calling a service method before serialization by the serializer, and
wherein the data regarding the response message includes a return value after deserialization by the deserializer.

7. The storage device according to claim 6,
wherein both the conversion unit and the reverse conversion unit are coupled between the first extended application and the first service proxy.

8. A terminal apparatus that includes a Web service interface, sends a request to a Web service provider of each of a plurality of cloud services or image forming apparatuses via a Web service interface, receives results, and displays a content of the results on the terminal apparatus, comprising:

a communication unit configured to transmit a request message to a Web service and receive a response message from the Web service;

a conversion table configured to store a pre-conversion side service method name of the Web service that corresponds with a post-conversion side service method name;

a reverse conversion unit configured to, when data regarding the request message includes the post-conversion side service method name stored in the conversion table, convert the post-conversion side service method name into the corresponding pre-conversion side service method name; and a conversion unit configured to, when data regarding the response message includes the pre-conversion side service method name stored in the conversion table, convert the pre-conversion side service method name into the corresponding post-conversion side service method name, wherein forms of both the pre-conversion side service method name and the post-conversion side service method name are made the same, by converting a service method name in the form of "noun+verb" into a service method name in the form of "verb+noun", or by converting a service method name including an abbreviation form into a service method name without an abbreviation;

a first service proxy configured to receive a service method call from a first extended application and transmit the response message to the first extended application;

a serializer configured to serialize the service method call and transmit the serialized service method call to the communication unit; and a deserializer configured to receive the serialized service method call from the communication unit, deserialize the serialized service method call, and transmit the deserialized service method call to the first service proxy, wherein a post process is performed after development of the first extended application has been completed, and the post process includes i) generating a second service proxy based on a Web Service Description Language (WSDL) file using a WSDL tool; ii) replacing the first service proxy with the second service proxy; iii) converting the first extended application to a second extended application after a piece of source code of the first extended application including a post-conversion service method stored in the conversion table has been replaced by a corresponding pre-conversion side service method name; iv) omitting the conversion table, the reverse conversion unit, and the conversion unit; and v) combining the serializer and the deserializer to a Web client of the terminal apparatus.

9. The terminal apparatus according to claim 8, wherein both the conversion unit and the reverse conversion unit are coupled between the first service proxy and the communication unit.

10. The terminal apparatus according to claim 8, wherein both the conversion unit and the reverse conversion unit are coupled between the first service proxy and the first extended application.

11. The terminal apparatus according to claim 8,
wherein the data regarding the request message includes the serialized request message, and
wherein the data regarding the response message includes the serialized response message.

12. The terminal apparatus according to claim 11,
wherein the reverse conversion unit is coupled between the serializer and the communication unit, and
wherein the conversion unit is coupled between the deserializer and the communication unit.

13. The terminal apparatus according to claim 8,
wherein the data regarding the request message includes code calling a service method before serialization by the serializer; and
wherein the data regarding the response message includes a return value after deserialization by the deserializer.

14. The terminal apparatus according to claim 13, wherein both the conversion unit and the reverse conversion unit are coupled between the first extended application and the first service proxy.

* * * * *